(12) United States Patent  
Zhang et al.

(10) Patent No.: US 10,686,913 B2  
(45) Date of Patent: Jun. 16, 2020

(54) PACKET SENDING METHOD AND APPARATUS, CHIP, AND TERMINAL

(71) Applicant: HUAWEI TECHNOLOGIES CO., LTD., Shenzhen, Guangdong (CN)

(72) Inventors: Zhong Zhang, Shenzhen (CN); Yu Deng, Shanghai (CN); Neng Yang, Shenzhen (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 0 days.

(21) Appl. No.: 16/398,078

(22) Filed: Apr. 29, 2019

(65) Prior Publication Data

US 2019/0268445 A1 Aug. 29, 2019

Related U.S. Application Data

(63) Continuation of application No. PCT/CN2017/109133, filed on Nov. 2, 2017.

(30) Foreign Application Priority Data

Nov. 2, 2016 (CN) .......................... 2016 1 0946705

(51) Int. Cl.
*H04L 29/06* (2006.01)
*H04L 12/807* (2013.01)
(Continued)

(52) U.S. Cl.
CPC .............. *H04L 69/16* (2013.01); *H04L 1/187* (2013.01); *H04L 47/27* (2013.01); *H04L 47/32* (2013.01); *H04L 1/188* (2013.01)

(58) Field of Classification Search
CPC ..... H04W 12/02; H04W 12/04; H04W 12/12; H04W 4/06; H04W 4/38; H04W 56/00; H04W 4/21; H04W 4/80
(Continued)

(56) References Cited

U.S. PATENT DOCUMENTS

2003/0035420 A1 2/2003 Niu
2005/0129036 A1* 6/2005 Sawabe ............. H04L 12/40143
370/401
(Continued)

FOREIGN PATENT DOCUMENTS

CN 101052006 A 10/2007
CN 101232446 A 7/2008
(Continued)

*Primary Examiner* — Natasha W Cosme
(74) *Attorney, Agent, or Firm* — Womble Bond Dickinson (US) LLP

(57) ABSTRACT

This application provides a packet sending method, an apparatus and a chip. The method is applied to a terminal, the terminal includes a baseband processor, an application processor, and a communications interface. The baseband processor reports information about a first packet to the application processor, where the first packet is a to-be-sent packet discarded by the baseband processor. The application processor transmits a second packet to the baseband processor according to the information about the first packet, where the second packet is the same as the first packet. The baseband processor sends the second packet to a network device by using the communications interface.

20 Claims, 8 Drawing Sheets

(51) Int. Cl.
*H04L 12/823* (2013.01)
*H04L 1/18* (2006.01)

(58) Field of Classification Search
USPC .......................................................... 370/235
See application file for complete search history.

(56) References Cited

U.S. PATENT DOCUMENTS

| | | |
|---|---|---|
| 2010/0122134 A1 | 5/2010 | Shaukat et al. |
| 2014/0341028 A1 | 11/2014 | Delorme et al. |
| 2015/0201436 A1 | 7/2015 | Sheng |

FOREIGN PATENT DOCUMENTS

| | | |
|---|---|---|
| CN | 101860435 A | 10/2010 |
| CN | 102210119 A | 10/2011 |
| CN | 103650401 A | 3/2014 |
| CN | 103986548 A | 8/2014 |
| EP | 1686716 B1 | 8/2006 |
| WO | 03043278 A1 | 5/2003 |
| WO | 2010054388 A2 | 5/2010 |

* cited by examiner

CONT.
FROM

PACKET SENDING METHOD AND APPARATUS, CHIP, AND TERMINAL

CROSS-REFERENCE TO RELATED APPLICATIONS

This application is a continuation of International Application No. PCT/CN2017/109133, filed on Nov. 2, 2017, which claims priority to Chinese Patent Application No. 201610946705.1, filed on Nov. 2, 2016. The disclosures of the aforementioned applications are hereby incorporated by reference in their entireties.

TECHNICAL FIELD

The present invention relates to the communications field, and more specifically, to a packet sending method and apparatus, a chip, and a terminal.

BACKGROUND

As mobile Internet access has become a main characteristic of a terminal, a technical solution used by the terminal to access a network continuously develops. This greatly improves an information obtaining rate of a terminal product. Transmission Control Protocol/Internet Protocol (TCP/IP) commonly used in the mobile communications field is a connection-oriented, reliable, and byte stream-based transport layer communication protocol.

In a process in which a terminal accesses a network by using the TCP/IP protocol, a packet is frequently discarded (which is also referred to as a packet loss). A current processing method is usually that a transmit end retransmits data. In the current processing method, whether a packet is lost is determined depending on a feedback from a receive end. For example, if the transmit end has not received, within a specified time period, a feedback message such as an ACK sent by the receive end, it is determined that a packet is lost, and a packet including data of the lost packet is resent. In this solution, a terminal has a relatively large delay when responding to a packet loss, a stalling time of data transmission between the terminal and a network device is relatively long, and real-time communication quality is relatively severely affected.

SUMMARY

In view of this, This application provide a packet sending method and apparatus, a chip, and a terminal, so as to reduce a delay of retransmitting, by a terminal, a to-be-sent packet discarded by a baseband processor, and reduce, to some extent, a delay of responding to a packet loss by the terminal, so that data transmission between the terminal and a network is smoother.

According to a first aspect, an embodiment of the present invention provides a packet sending method, where the method is applied to a terminal, the terminal includes a baseband processor, an application processor, and a communications interface, and the method includes: reporting, by the baseband processor, information about a first packet to the application processor, where the first packet is a to-be-sent packet discarded by the baseband processor, and the information about the first packet includes an identifier of the first packet and an identifier of a TCP connection by which the first packet is transmitted; transmitting, by the application processor, a second packet to the baseband processor according to the information about the first packet, where the second packet is the same as the first packet; and sending, by the baseband processor, the second packet to a network device by using the communications interface.

It should be noted that the to-be-sent packet discarded by the baseband processor may also be understood as a packet that is delivered by the application processor to the baseband processor and that fails to be sent by the baseband processor to the network device by using the communications interface.

It should be noted that the network device may be a device such as a base station or a server.

The second packet may be understood as a copy of the first packet.

In this way, after discarding the to-be-sent packet, the baseband processor may report, to the application processor, the information about the to-be-sent packet discarded by the baseband processor, so that the application processor can redeliver, to the baseband processor according to the reported information, a copy of the packet discarded by the baseband processor. It can be determined, before it is determined that a timeout timer of the packet expires and no acknowledgement packet is received from a peer end, that the packet is discarded and the packet is resent to the baseband processor. This can reduce a delay of retransmitting, by the terminal, the to-be-sent packet discarded by the baseband processor, and reduce, to some extent, a delay of responding to a packet loss by the terminal, so that data transmission between the terminal and a network is smoother. Because a status of a wireless cellular network often changes, a case in which the baseband processor discards a to-be-sent packet occurs frequently.

In a first embodiment of the first aspect, the reporting, by the baseband processor, information about a first packet to the application processor includes: when a data connection of the terminal is available, reporting, by the baseband processor, the information about the first packet to the application processor.

A data connection is a connection used to carry a data service. The data connection of the terminal may be understood as a data connection between the terminal and a base station.

In a second embodiment of the first aspect, when the data connection of the terminal is unavailable, the baseband processor caches the information about the first packet, and when the data connection of the terminal is switched from unavailable to available, the baseband processor reports the information about the first packet to the application processor.

It should be understood that the terminal may determine, by means of periodic detection, event trigger, instruction trigger, or the like, whether the data connection of the terminal is available or unavailable. The data connection of the terminal is unavailable in any one of the following cases: the terminal is in a disconnected state; the terminal fails to normally camp on any serving cell; a data service of the terminal is in a disabled state; or the terminal is in a 2G call scenario when a circuit switched domain falls back (Circuit Switched Fallback, CSFB) to 2G.

It should be noted that when the data connection of the terminal is switched from unavailable to available, the baseband processor reports the information about the first packet to the application processor. This indicates that the baseband processor reports the information about the first packet to the application processor after the data connection of the terminal is switched from unavailable to available. Immediately reporting the information when the data connection of the terminal becomes available is not required because it takes time to read an instruction, perform a related operation, and the like. That is, within a relatively short period of time (for example, several milliseconds or several seconds) after the data connection of the terminal is switched from unavailable to available, the baseband processor completes an action of reporting the information about the first packet to the application processor.

In the first embodiment and the second embodiment, the baseband processor reports the information about the discarded to-be-sent packet to the application processor only when the data connection is available, so that retransmission validity can be improved. If the information about the discarded to-be-sent packet is reported to the application processor only when the data connection is available, energy consumption of the terminal can be reduced.

In another embodiment, after the transmitting, by the application processor, a second packet to the baseband processor according to the information about the first packet, the method further includes: increasing, by the application processor, value of congestion window of the TCP connection.

After the application processor transmits the second packet to the baseband processor, the congestion window may have been decreased. The method may increase or restore the congestion window back to the original value. This way, impact from timeout retransmission can be eliminated, a quantity of packets sent by the terminal can be ensured, and a transmission throughput of the terminal can be improved.

In another embodiment, the identifier of the first packet is a sequence number of the first packet, and the TCP connection by which the first packet is transmitted is a source port number of the TCP connection; and the transmitting, by the application processor, a second packet to the baseband processor according to the information about the first packet includes: transmitting, by the application processor, the second packet that has a same sequence number as the first packet to the baseband processor according to the source port number.

According to a second aspect, an embodiment of the present invention provides a packet sending apparatus, and the apparatus includes a baseband processor, an application processor, and a transmitter. The baseband processor is configured to report information about a first packet to the application processor, where the first packet is a to-be-sent packet discarded by the baseband processor, and the information about the first packet includes an identifier of the first packet and an identifier of a TCP connection by which the first packet is transmitted; the application processor is configured to transmit a second packet to the baseband processor according to the information about the first packet, where the second packet is the same as the first packet; and the baseband processor is further configured to send the second packet to a network device by using the transmitter.

Because the second aspect is an apparatus corresponding to the first aspect, for various implementations, descriptions, and technical effects, refer to the descriptions in the first aspect.

According to a third aspect, a chip is provided. The chip establishes a data connection to a network device by using a radio frequency component, and the chip includes an application processor and a baseband processor; the baseband processor is configured to report information about a first packet to the application processor, where the first packet is a to-be-sent packet discarded by the baseband processor, and the information about the first packet includes an identifier of the first packet and an identifier of a TCP connection by which the first packet is transmitted; the application processor is configured to transmit a second packet to the baseband processor according to the information about the first packet, where the second packet is the same as the first packet; and the baseband processor is further configured to send the second packet to the network device by using the radio frequency component.

The third aspect is a specific product form of the second aspect. For various implementations, descriptions, and technical effects of the third aspect, refer to the second aspect, and details are not described herein again.

According to a fourth aspect, a terminal is provided. The terminal includes an application processor, a baseband processor, a memory, and a communications interface. The application processor, the baseband processor, and the communications interface are connected to the memory; and the application processor, the baseband processor, and the communications interface perform the method in any one of the embodiments of the first aspect by invoking an instruction stored in the memory.

According to a fifth aspect, a storage medium is provided and is configured to store code for implementing any one of the method according to the embodiments of the first aspect.

For the various implementations, descriptions, and technical effects of the fourth aspect and the fifth aspect, refer to the first aspect, and details are not described herein again.

BRIEF DESCRIPTION OF DRAWINGS

To describe the technical solutions in the application more clearly, the following briefly describes the accompanying drawings required for describing the embodiments. The accompanying drawings in the following description show merely some embodiments of the disclosure, and a person of ordinary skill in the art may still derive other drawings from these accompanying drawings without creative efforts.

DESCRIPTION OF EMBODIMENTS

Figure 1:
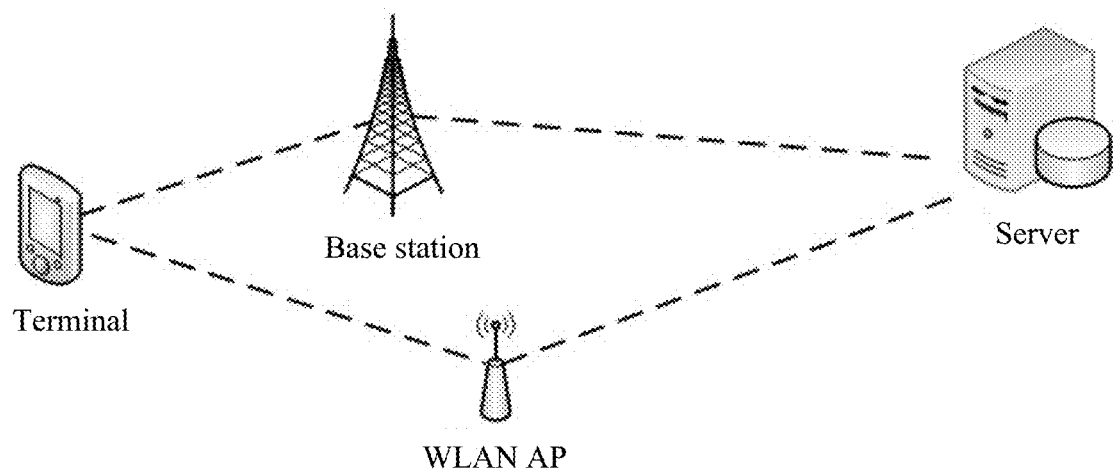
FIG. 1 is a schematic diagram of networking of a system according to an embodiment of the present invention.

This application provides a packet sending method and apparatus, a chip, and a terminal. The following clearly and describes the technical solutions in this application with reference to the accompanying drawings in this application. Apparently, the described embodiments are merely some but not all of the embodiments of this disclosure. All other embodiments obtained by a person of ordinary skill in the art based on this application without creative efforts shall fall within the protection scope of the present invention.

The following are some technical terms in this application:

A congestion window is a maximum quantity of data packets that can be sent by a source end of data within one round trip time (RTT) period during TCP data transmission in the case of congestion control. Congestion window backoff means that a source end of data decreases a congestion window when a network is congested.

Mobile communications services are classified into a data service and a voice service. The data service includes services other than mobile communications CS (Circuit Switched) domain voice services. A data connection may be understood as a data connection between a terminal and a base station, and indicates a connection that is between the terminal and the base station and that is used for processing a data service. That a data connection between a terminal and a base station is available indicates that the terminal uses a cellular network to process a data service, that is, the terminal can receive a signal from a base station in the cellular network, and the terminal can use a function of exchanging data or an instruction in a data service with the base station, wherein the data and the instruction are of a data service. That a data connection between a terminal and a base station is unavailable indicates that the terminal cannot use a cellular network to process a data service, that is, the terminal cannot receive a signal from the cellular network, or the terminal needs to process a voice service and therefore cannot exchange data or an instruction in a data service with the base station in the cellular network at the same time. Currently, a known case in which a data connection of a terminal is unavailable includes: the terminal is in a disconnected state; the terminal fails to normally camp on any serving cell; a data service of the terminal is in a disabled state; or the terminal is in a 2G call scenario when a circuit switched domain falls back (Circuit Switched Fallback, CSFB) to 2G.

A to-be-sent packet is a packet that is to be sent by a terminal to a base station, and is usually a TCP packet obtained by encapsulating, by using a protocol stack, data that is generated by an application running on the terminal and that needs to be sent to the base station. Data in the to-be-sent packet may be generated due to some actions or behavior of a user. For example, the application is a browser. The user taps a link displayed on the browser, or enters an account or a password of a website. Data on the link or the account or the password entered by the user is data that the browser needs to send to the base station. Data in the to-be-sent packet may alternatively be generated in a running process by an application for executing a task. For example, the application is a browser. To periodically refresh a news window on a home page, the browser generates request data that needs to be sent to the base station. A packet obtained by encapsulating the data by using the protocol stack is a to-be-sent packet before being sent by the terminal using a radio frequency component (for example, an antenna) of the terminal. A person skilled in the art should understand that the terminal may generate or determine a to-be-sent packet. A manner of generating a to-be-sent packet is not limited in the present invention.

The term "sameness" as used in this application indicates exact sameness or essential sameness. For example, when a first packet and a second packet are TCP packets, that the first packet is the same as the second packet indicates that the first packet and the second packet are the same in terms of at least information such as a data part, a source port number, and a destination port number. The second packet may be understood as a copy of the first packet, allowing negligible differences between packet headers or packet trailers of the first packet and the second packet. These differences may be generated by a terminal during generation of a packet due to reasons such as when time stamps are different, or some randomly generated values are different.

Technical solutions provided in the this application may be typically applied to a wireless communications system, for example, a Global System for Mobile Communications (GSM) network, a Code Division Multiple Access (CDMA) network, a Time Division-Synchronous Code Division Multiple Access (TD-SCDMA) network, a Wideband Code Division Multiple Access (WCDMA) network, a general packet radio service (GPRS) network, a Long Term Evolution (LTE) network, a software defined network (SDN), or a wireless sensor network.

Figure 2:
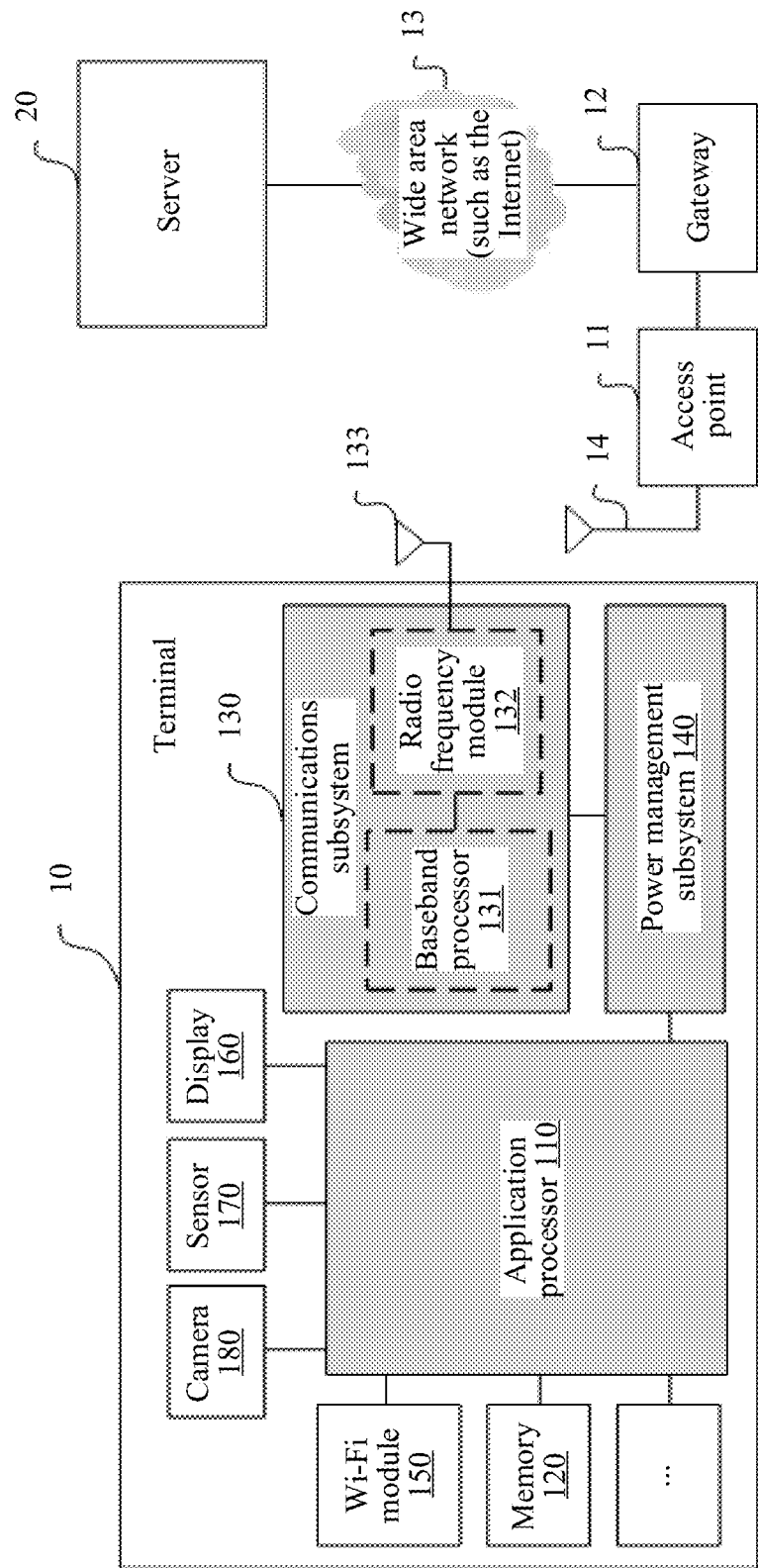
FIG. 2 is a schematic diagram of a hardware structure of a terminal according to an embodiment of the present invention.

FIG. 2 is a simplified block diagram of a communications system 100 according to an embodiment of the present invention. The communications system 100 is used only as one embodiment of the present invention. This should not be construed as a limitation on the possible embodiments of the present invention.

In the specification, claims, and accompanying drawings of the present invention, the terms "first", "second", "third", "fourth", or the like (if existent) are intended to distinguish between similar objects but do not necessarily indicate a particular order or sequence.

As shown in FIG. 2, the communications system 100 includes a terminal 10, an access point 11, a gateway 12, a wide area network 13, and a server 20. The terminal 10 in this embodiment of the present invention may be a mobile terminal, for example, a portable, wearable, or in-vehicle mobile device such as a mobile phone, a tablet computer, a sports shooting device, or a notebook computer, or may be a device such as a computer or a server that can access a cellular network, or even a network device such as a router or a gateway that can access a cellular network, for example, a router or a gateway that can use a SIM (subscriber identification module) card. A mobile phone is used as an embodiment of the present invention. The server 20 may be an application server, a server agent, a data center server, or a network device such as a router or a gateway.

A person skilled in the art may understand that a communications system usually may include fewer or more components than those shown in FIG. 2, or include components different from those shown in FIG. 2. FIG. 2 only shows components more related to an embodiment of the present invention. For example, although FIG. 2 shows one server 20, a person skilled in the art may understand that one communications system may include any quantity of servers.

The wide area network 13 may include a part of a public network, a dedicated network, or the Internet, and/or any combination thereof. The access point may be a base station, a wireless local area network (WLAN) access point, or an access point in another form. The gateway 12 and the access point 11 may be included in a wireless network. For brevity, other parts of the wireless network are not described.

FIG. 2 further shows a hardware structure of the terminal 10. According to FIG. 2, the terminal 10 includes an application processor 110, a memory 120, a communications subsystem 130, and a power management subsystem 140. The memory 120 stores an executable program, and the executable program includes an operating system and an application program. The application processor 110 is a processor configured to run the operating system and the application program.

In an embodiment, the application program is a web browser, and the server 20 is a server of a web content provider. In another embodiment, the application program is an online video player, and the server 20 is a server of a video content provider. In another embodiment, the application program is instant messaging software, and the server 20 is a server of an instant messaging service provider.

The communications subsystem 130 mainly implements functions such as baseband processing, modulation and demodulation, signal amplification and filtering, and balancing. The communications subsystem 130 includes a radio frequency module 132, an antenna 133, and a baseband processor (BP) 131 that is also referred to as a wireless modem or simply modem. It should be noted that the baseband processor 131 and a Wi-Fi module 150 may be integrated into one chip. In addition, the baseband processor 131 and the application processor 110 may be integrated into one chip, or each may be an independent chip. FIG. 2 is merely one embodiment of a communication system. The power management subsystem 140 is configured to supply power to a system.

The memory 120 usually includes an internal memory and an external storage. The internal memory may be a random access memory (RAM), a read-only memory (ROM), a cache, or the like. The external storage may be a hard disk, an optical disc, a USB flash drive, a floppy disk, a tape drive, or the like. The executable program is usually stored in the external storage, and the application processor 110 executes the program after loading the executable program from the external storage into the internal memory.

In one embodiment, the terminal 10 further includes the Wi-Fi (Wireless Fidelity) module 150, the Wi-Fi module 150 supports the IEEE 802.11 series of protocols, and the terminal 10 may access a WLAN by using the Wi-Fi module 150.

In one embodiment, the terminal 10 further includes a display 160 that is configured to display information entered by a user or information provided for a user, and various menu interfaces of the terminal 10. The display 160 may be a liquid crystal display (LCD), an organic light-emitting diode (OLED), or the like. In some other embodiments, a touch panel may cover the display 160, to form a touch display screen.

In addition, the terminal 10 may further include a camera 180 for shooting a photo or video, and one or more sensors 170 such as a gravity sensor, an acceleration sensor, or an optical sensor.

In addition, a person skilled in the art may understand that the terminal 10 may include fewer or more components than those shown in FIG. 2, and in the terminal 10 shown in FIG. 2, only components more related to a plurality of embodiments of the present invention are shown.

The following further describes a hardware and software environment of the terminal 10. The terminal 10 may be divided, according to logic levels, into a hardware layer, an operating system, and an application layer (also referred to as a user mode) running above the operating system. The hardware layer includes hardware described in the embodiment related to FIG. 2, for example, the application processor 110, the memory 120, and the Wi-Fi module 150. The operating system may be an Android® operating system, a Linux® operating system, a Windows operating system, or an operating system of another type. This is not limited in this embodiment of the present invention.

Figure 3:
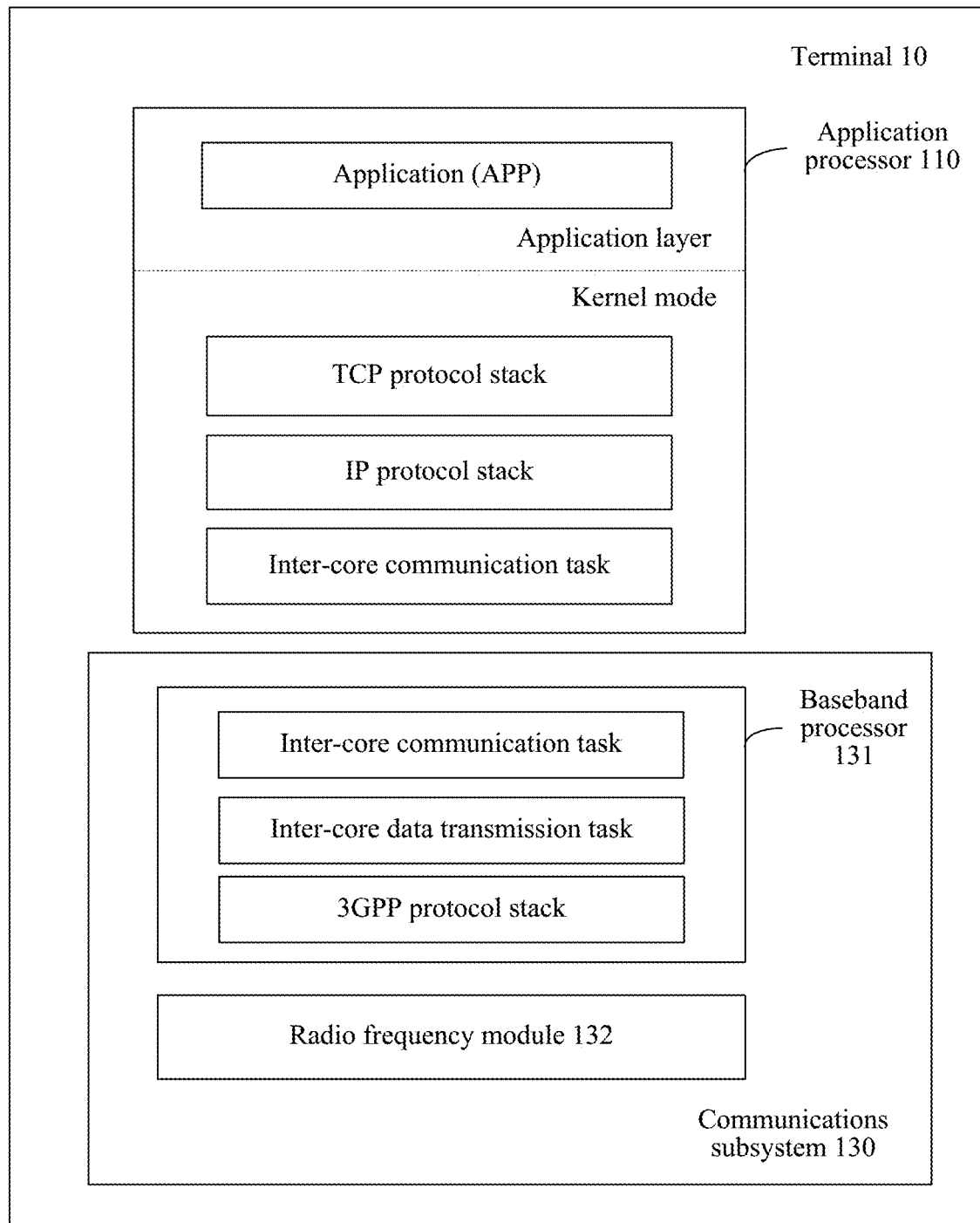
FIG. 3 is a schematic diagram of a software architecture of a terminal according to an embodiment of the present invention.

In an embodiment, the operating system includes a framework layer, a kernel mode, and a driver layer. The driver layer includes a driver of a hardware device such as a sensor driver, a Wi-Fi driver, and a display driver. The kernel mode includes a TCP protocol stack, an IP protocol stack, and the like. The following further describes the kernel mode with reference to a method in this embodiment of the present invention. The framework layer includes an interface for communication between the user mode and the kernel mode, and some services, for example, applications running at the application layer such as a graphic service, a system service, a web service, and a user service. These applications usually can directly interact with a user by using a display, and these applications are a gallery, a media player (media player), a browser (browser), WeChat, or the like. An application program in the operating system and an application program at the application layer may be stored in the memory 120 as executable programs. The term "program" used in this embodiment of the present invention should be widely construed as including but not limited to: an instruction, an instruction set, code, a code segment, a subroutine, a software module, an application, a software package, a thread, a process, a function, firmware, middleware, and the like. As shown in FIG. 2, the terminal 10 may access a cellular network by using the communications subsystem 130, and then communicate with the server 20 by using the wide area network 13. In another embodiment, the terminal 10 may also access the WLAN by using the Wi-Fi module 150, and then communicate with the server 20 by using the wide area network 13. Specifically, after accessing the network, the terminal 10 may establish a TCP connection to the server 20 by using the TCP/IP (Transmission Control Protocol/Internet Protocol) protocol stack, and then transmit data by using the TCP connection. The TCP/IP protocol stack is middleware used to implement a TCP/IP protocol suite defined in a TCP/IP reference model. The TCP protocol stack may be executed by an appropriate combination of software, hardware, and/or firmware on the terminal 10. The TCP/IP protocol suite includes two core protocols: TCP and IP. Establishment of the TCP connection between the terminal 10 and the server 20 may be initiated by an application program running on the terminal 10. A browser in FIG. 3 is used as an example of the application layer. The browser generates a socket open command, and the command is transferred to the TCP protocol stack of the terminal 10, to trigger the TCP protocol stack to establish a TCP connection to the server 20 by means of three-way message exchange (also referred to as "three-way handshake"). Then the TCP protocol stack notifies the browser that the connection has been established.

Figure 4:
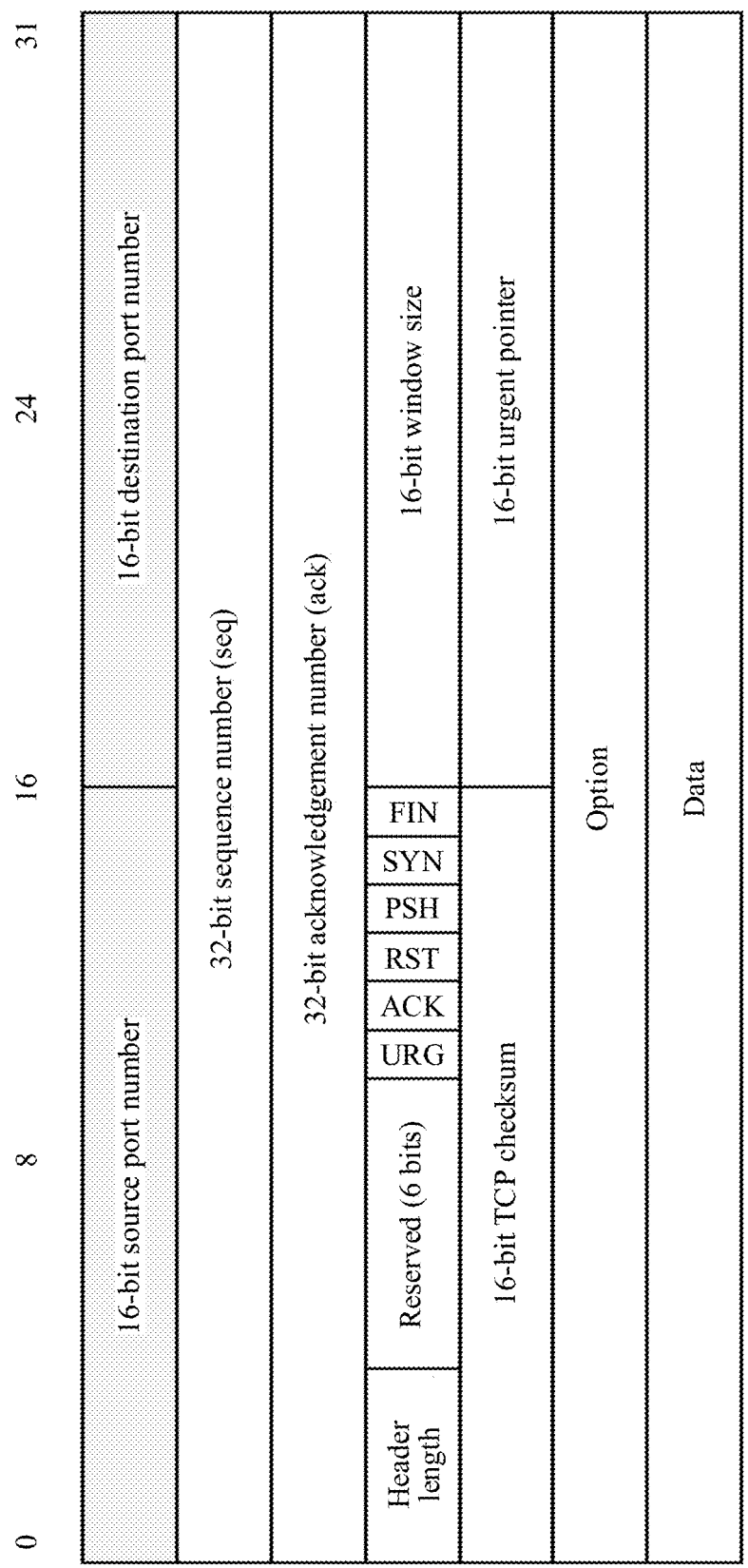
FIG. 4 is a schematic diagram of a TCP packet format according to an embodiment of the present invention.

Then, a TCP packet may be transmitted between the browser and the server 20 based on the established TCP connection. A TCP packet format is shown in FIG. 4. A source port and a destination port are configured to determine application processes of a transmit end and a receive end, and a TCP connection may be uniquely determined by using the source port, the destination port, a source IP address, and a destination IP address. A sequence number (usually referred to as seq for short) field in a TCP packet header carries a sequence number of a first data byte in packet load. After receiving a TCP packet, the receive end sends an acknowledgement (ACK for short) packet to the transmit end. An acknowledgement number (usually referred to as ack for short) field value of an ACK header represents a value of a "sequence number" field of a packet received by the receive end, and also means that the receive end has received all packets whose "sequence number"

values are less than a value of the "acknowledgement number" of the ACK packet. A window size is used to indicate a size of a current receive buffer of the receive end. In addition, the TCP packet header has six flag bits and one customizable option (Option) field, the option field may be used to carry additional information, and definitions of the six flag bits are as follows:

URG indicates that an urgent pointer is valid.

ACK indicates that an acknowledgement number is valid.

PSH indicates immediately pushing data to an application layer for processing.

RST indicates abnormal resetting.

SYN is a synchronization flag, and a connection is established when SYN is set to 1.

FIN is a finish flag used for requesting to release a connection.

The following briefly describes a TCP retransmission mechanism and a congestion control mechanism. For description simplicity, one of two devices between which a communication connection has been established in this application is referred to as a transmit end, and the other is referred to as a receive end. It may be understood that the transmit end and the receive end may each be any device that has a data receiving and transmitting capability. For example, the transmit end may be the server 20, and the receive end may be the terminal 10. In addition, the transmit end and the receive end are two relative roles, and may be interchangeable, that is, in different scenarios, a same device may be a transmit end, or may be a receive end.

A TCP retransmission mechanism ensures reliable transmission of a packet, and the retransmission mechanism mainly includes timeout retransmission and fast retransmission. A basic process of timeout retransmission is as follows: After sending a packet, the transmit end starts a timeout timer, and if the transmit end still receives, after the timeout timer expires, no acknowledgement packet indicating that the packet has been correctly received, the transmit end resends the packet. A value of the timeout timer is usually expressed as RTO (Retransmission Timeout). RTO is usually set as RTT (Round Trip Time), that is, time consumed from sending a packet to receiving an acknowledgement for the packet. The RTT may be obtained by means of sampling.

However, it should be understood that a wireless communications system provides a service for a terminal, and with development of technologies, the terminal usually supports a plurality of types of communication protocols, such as 2G, 3G, and 4G networks. For reasons such as a change of a terminal location, a network usually becomes unstable or signal strength changes. For example, in an area with a weak signal, such as an elevator or an underground parking lot, or in a scenario in which the terminal is in a fast moving transportation means such as a bullet train or a high-speed railway, a network connection status of the terminal changes due to network signal instability. For example, the terminal may be handed over in different types of cellular networks, for example, from LTE to WCDMA, or within a period of time, the terminal is disconnected from a network and reconnected to the network, and this type of change is even frequent in a period of time. In such a scenario, when the terminal is used as a transmit end, during sending of a packet that is to be sent to a cellular network, a modem of the terminal may discard the packet. A packet loss caused in this case may also be referred to as active packet discard. Therefore, the active packet discard often occurs on a terminal that uses the cellular network.

It may be learned that active packet discard is a behavior occurring before a packet enters a network for transmission, and data is not lost in a network transmission process. According to the foregoing descriptions, in the TCP retransmission mechanism, packet loss causes are not distinguished. Usually, retransmission needs to be performed after a feedback from a network side is received, and therefore the mobile terminal has a relatively large delay when responding to the active packet discard. In this embodiment of the present invention, optimization is mainly performed, so that a TCP protocol stack in the application processor 110 can sense a packet loss of to-be-sent data in the baseband processor 131, so as to reduce a delay of responding by the mobile terminal to the active packet discard. It may be understood that the method in this embodiment of the present invention is also applicable to another reliable transport protocol that includes a packet retransmission mechanism. In this embodiment of the present invention, a TCP packet is used as an example for description.

FIG. 3 further shows a software architecture used in a process in which the application processor 110 and the baseband processor 131 in FIG. 1 cooperate to process data in this embodiment of the present invention. The application processor 110 may be considered as a processor core, and the baseband processor 131 (also referred to as a modem) is considered as another processor core. The software architecture can support a mechanism for data communication between the two cores. Communication between the two cores complies with a specific inter-core communication protocol. A type of the inter-core communication protocol is not limited in this embodiment of the present invention. A process in which a terminal in this embodiment of the present invention is used as a source end of data to send a data packet to a network side device is simply described below with reference to FIG. 3. In the application processor 110, after an application (APP) at an application layer transfers a data packet through a TCP protocol stack and an IP protocol stack of a kernel (also referred to as a kernel mode) by using a socket interface of a source end of a TCP connection, respective tasks (which may also be understood as threads) that are of the application processor 110 and the modem and that are used for inter-core communication are used to transfer the data packet to a 3GPP ($3^{rd}$ Generation Partnership Project) protocol stack (which may also be understood as a task or a thread) in the modem, and then the 3GPP protocol stack sends the data packet from the terminal by using hardware in the communications subsystem 130. The 3GPP protocol stack is used to carry one or more communication protocols at a data link layer and a physical layer. The communication protocols are mainly communication protocols used for various cellular networks, and are not limited to various communication protocols of the 3G network, and may be, for example, GSM, CDMA, or LTE. This is not limited in the present invention. In this embodiment of the present invention, a type of a kernel of the terminal is determined by a type of an operating system of the terminal, and is not limited in the present invention. For example, the kernel may be a Linux kernel (Android kernel) or a Windows kernel. In an implementation, inter-core communication tasks used for transmitting relatively big data (such as a data packet) between the application processor 110 and the modem are different from those used for transmitting information (such as heartbeat information or a control instruction) with a relatively small data volume between the application processor 110 and the modem. Further, an inter-core communication task used for transmitting information with a relatively small data volume may be implemented as follows: One task runs in each of the application processor 110 and the baseband processor 131, information with a relatively small data volume may be transmitted between the two tasks, and information transmission between the two processors may be implemented by means of communication between the two tasks.

Specifically, in the modem, a 3GPP protocol stack and a task that is used for transmitting a data packet with the application processor 110 have respective data packet cache queues, and a timer is usually configured so as to monitor these data packet cache queues. Specifically, different protocols in the 3GPP protocol stack are usually corresponding to different data packet cache queues. For example, a PDCP (Packet Data Convergence Protocol) queue is used in the LTE protocol, and a PDCP queue or an RLC (Radio Link Control) queue is used in the WCDMA or TD-SCDMA protocol. In a plurality of cases, a data packet in a data packet cache queue is actively discarded by the modem, and cannot be sent to a network device. The following briefly enumerates some typical packet discard scenarios. It should be understood that the packet discard scenarios in this embodiment of the present invention are not limited to the following examples.

For example, in a task that is in the modem and that is used to transmit a data packet with the processor 110, after receiving a data packet from the application processor 110, it is usually determined whether a Radio Resource Control (RRC) connection has been established. If the RRC connection has been established, the received data packet is transmitted to the 3GPP protocol stack for processing. If the RRC connection has not been established, the data packet is cached in a queue of the task, and is transmitted after the RRC connection is successfully established. In the task, a data packet is discarded when the data packet fails to be saved in the cache queue, or when a timer of the cache queue of the task expires and the RRC connection still fails to be established, a data packet in the cache queue is discarded, or in the task, a data packet in the cache queue is actively cleared after an ERABM (E-UTRAN radio access bearer management) message that is used to clear the data packet cache queue of the task is received.

The 3GPP protocol stack may find, by means of detection, an event due to which the terminal cannot use a cellular network to process a data service, so as to determine whether a data connection of the terminal is available. For example, the terminal is in a disconnected state, the terminal fails to normally camp on any serving cell, a data service of the terminal is in a disabled state, or the terminal is in a 2G call scenario when a circuit switched domain falls back (Circuit Switched Fallback, CSFB) to 2G In the foregoing several scenarios, the data connection of the terminal is unavailable. An event that causes unavailability of the data connection of the terminal is not limited in this embodiment of the present invention. Alternatively, the 3GPP protocol stack may collect some parameters used to represent whether the terminal can use a cellular network to process a data service, such as strength of a cellular network signal received or accessed by the terminal, a type of the cellular network accessed by the terminal, and whether the terminal is running a voice service. The baseband processor determines, by means of calculation according to a preset algorithm, whether the current data connection of the terminal is available. A specific parameter and a specific algorithm are not limited in this embodiment of the present invention. The foregoing detection or calculation may be periodically performed by the 3GPP protocol stack, or may be triggered by some instructions, or may be triggered by the foregoing event. How the 3GPP protocol stack determines whether the data connection of the terminal is available is not limited in this embodiment of the present invention. It should be understood that, in a process in which the terminal uses a cellular network to process a data service, RRC link establishment and disconnection are involved, are often performed in a data service interaction process between the terminal and a base station, and are actually a process of further establishing a TCP connection when a data connection between the terminal and the base station is available, that is, a connection at the physical layer and a Media Access Control layer. Therefore, in this embodiment of the present invention, both RRC link establishment and disconnection occur on a premise that the data connection of the terminal is available. That the terminal determines whether the data connection is available is irrelevant to RRC link establishment and disconnection.

In addition, the 3GPP protocol stack may actively discard a to-be-sent packet in the following cases:

The terminal is handed over between different wireless cellular networks. For example, the terminal is handed over from an LTE network to a WCDMA network, a TD-SCDMA network, or a GSM network. This may be caused because the terminal cannot be connected to a 4G base station due to an unstable 4G network in an actual scenario, or in a scenario in which a VoLTE (Voice over LTE) technology is not used currently, or voice communication is started in an LTE network (for example, a CSFB scenario). When the terminal is handed over to a 3G network or a 2G network, this event may cause release at an L2 layer (that is, LTE layer 2, including a MAC layer, an RLC layer, and a PDCP layer). For example, the PDCP queue is released, and the modem clears a to-be-sent packet in the PDCP queue. For another example, the terminal is handed over from WCDMA or TD-SCDMA to LTE. This event may also cause release at the L2 layer.

Configuration of a network parameter is improper. For example, when the terminal uses the LTE network, the improper parameter may cause PDCP reconfiguration, and the modem clears the to-be-sent packet in the PDCP queue. When the terminal uses the WCDMA or TD-SCDMA network, the improper parameter may cause RLC reconfiguration. The RLC layer is located above the MAC layer, and is a part of the L2 layer together with the MAC layer, and the modem clears the to-be-sent packet.

When the terminal uses the WCDMA or TD-SCDMA network, RNC (Radio Network Controller) handover may cause RLC re-establishment, and the modem clears the to-be-sent packet.

The PDCP queue is full, and a packet delivered by the application processor 110 cannot be inserted into the queue and is discarded by the modem. This case may occur in the LTE network or the WCDMA or TD-SCDMA network.

In a cellular network, a plurality of radio bearers (that is, links established by the data link layer in the 3GPP protocol stack) may serve a plurality of services of an application. Usually, one service uses one bearer. Each bearer corresponds to a to-be-sent packet cached in one PDCP queue. When a service on a bearer is abnormally interrupted due to a network problem, the modem actively clears a to-be-sent packet in a PDCP queue corresponding to the service.

For ease of understanding, FIG. 4 is a schematic diagram of a TCP packet format.

Figure 5:
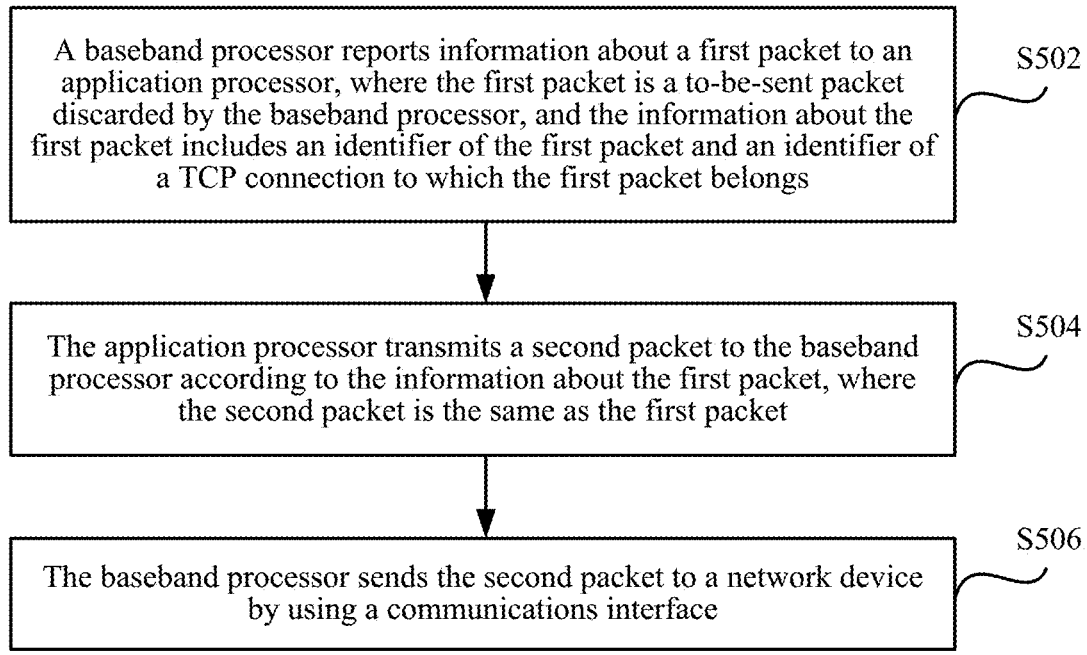
FIG. 5 is a schematic diagram of a packet sending method according to an embodiment of the present invention.

With reference to FIG. 5, the following describes a packet sending method provided in an embodiment of the present invention. The method is applied to a terminal, the terminal includes an application processor, a baseband processor, and a communications interface, and the method includes the following blocks.

Block S502. The baseband processor reports information about a first packet to the application processor, where the first packet is a to-be-sent packet discarded by the baseband processor.

The information about the first packet includes an identifier of the first packet and an identifier of a TCP connection by using which the first packet is transmitted.

It should be noted that the to-be-sent packet discarded by the baseband processor may also be understood as a packet that is delivered by the application processor to the baseband processor and that fails to be sent by the baseband processor to a network device by using the communications interface.

The baseband processor may discard a plurality of to-be-sent packets. It may be learned from the foregoing descriptions that a to-be-sent packet may be discarded in many cases. Specifically, the baseband processor may record information about a discarded to-be-sent packet, or may monitor an event due to which the baseband processor discards a to-be-sent packet, for example, handover between different cellular networks, so as to determine a discarded to-be-sent packet. How the baseband processor obtains information about a discarded to-be-sent packet is not limited in this embodiment of the present invention.

The baseband processor may report the information about the discarded to-be-sent packet to the application processor. For ease of description, descriptions are provided by using the first packet as an example in which the first packet is a TCP packet. The information about the first packet includes the identifier of the first packet and the identifier of the TCP connection by which the first packet is transmitted. In an embodiment, the identifier of the first packet may be a sequence number of the packet. The identifier of the TCP connection by which the first packet is transmitted may be a source port number of the TCP connection. According to a TCP packet format (as shown in FIG. 4), the baseband processor may obtain the sequence number and the source port number by means of parsing in a process of processing the to-be-sent packet.

A person skilled in the art should understand that the baseband processor may determine information that is about a packet and that needs to be reported, and a specific implementation is not limited in this embodiment of the present invention. A specific transmission protocol is not limited to the TCP protocol.

In one embodiment, the baseband processor may select an appropriate occasion for reporting information about a discarded to-be-sent packet, and report information about a plurality of discarded packets on the appropriate occasion instead of performing reporting to the application processor immediately after a packet is discarded. Specifically, when a data connection of the terminal is available, the baseband processor reports the information about the first packet to the application processor. Alternatively, when the data connection of the terminal is unavailable, the baseband processor caches the information about the first packet, and when the data connection of the terminal is switched from unavailable to available, the baseband processor reports the information about the first packet to the application processor. It should be understood that the foregoing two manners can be used together.

A cache queue of the baseband processor may cache information to be reported to the application processor, and the information is the information about the to-be-sent packet discarded by the baseband processor.

A data connection is a connection used to carry a data service. The data connection of the terminal may be understood as a data connection between the terminal and a base station. For details, refer to the foregoing descriptions.

It should be noted that when the data connection of the terminal is switched from unavailable to available, the baseband processor reports the information about the first packet to the application processor. This indicates that the baseband processor reports the information about the first packet to the application processor after the data connection of the terminal is switched from unavailable to available. Immediately reporting the information when the data connection of the terminal becomes available is not strictly required because it takes time to read an instruction, perform a related operation, and the like. That is, within a relatively short period of time (for example, several milliseconds or several seconds) after the data connection of the terminal is switched from unavailable to available, the baseband processor completes an action of reporting the information about the first packet to the application processor.

It may be understood that, in this embodiment, the baseband processor needs to determine whether the data connection of the terminal is available.

It can be understood that the terminal may determine, by means of periodic detection, event trigger, instruction trigger, or the like, whether the data connection of the terminal is available or unavailable. An event used for determining whether the data connection is available, a specific analysis process and an algorithm used in the analysis, and how to trigger the baseband processor to determine whether the data connection of the terminal is available are not limited in this embodiment of the present invention. For further descriptions, refer to the foregoing related descriptions.

The baseband processor performs block S502 to enable the application processor to know that a packet is discarded, so as to retransmit a data packet to the baseband processor in time, and the baseband processor obtains the retransmitted data packet to send the data packet to a receive end. Therefore, if retransmission is performed when the data connection of the terminal is unavailable, the baseband processor actively discards a packet again because the data connection is unavailable, and this retransmission of the application processor is invalid. Therefore, if the baseband processor reports the information about the discarded to-be-sent packet to the application processor only when the data connection is available, retransmission validity can be improved. In addition, when performing block S502, the baseband processor needs to wake up the application processor. If the baseband processor reports information immediately after a packet is discarded, the application processor is frequently woken up, and therefore energy consumption of the terminal is greatly increased. A mobile terminal usually uses a battery, and requires as little power consumption as possible and as long a standby time as possible. Therefore, if the information about the discarded to-be-sent packet is reported to the application processor only when a network is available, energy consumption of the terminal can be reduced.

In another embodiment, the baseband processor may alternatively not consider whether the data connection of the terminal is available, but report, once information about a packet that needs to be retransmitted is determined, the information to the application processor. This is not limited in this embodiment of the present invention.

Block S504. The application processor transmits a second packet to the baseband processor according to the information about the first packet, where the second packet is the same as the first packet.

In an embodiment, the application processor obtains, according to the received information about the first packet, the information comprises the first packet and a source port of the TCP connection at which the first packet is located, and the application processor uses the source port to retransmit the first packet to the baseband processor.

The second packet may be understood as a copy of the first packet.

It should be understood that, according to a TCP transmission protocol, after a TCP protocol stack of a transmit end sends a packet to a lower layer, a copy of the packet is saved in a queue of the TCP connection. The copy of the packet is not deleted until an ACK returned by a receive end of the TCP connection is received to acknowledge that the packet has been successfully received by the receive end. Otherwise, if an ACK returned by a receive end of the TCP connection is not received, the copy of the packet is stored for retransmission in the case of transmission timeout. Therefore, the application processor may retransmit the second packet to the baseband processor according to the information that is about the first packet and that is reported by the baseband processor.

Block S506. The baseband processor sends the second packet to a network device by using the communications interface.

The network device may be a network device such as a base station or a server in a cellular network. This is not limited in this embodiment of the present invention.

In conclusion, after discarding the to-be-sent packet, the baseband processor may report, to the application processor, the information about the to-be-sent packet discarded by the baseband processor, so that the application processor can redeliver, to the baseband processor according to the reported information, a copy of the packet discarded by the baseband processor. It can be determined, before it is determined that a timeout timer of the packet expires and no acknowledgement packet is received from a peer end, that the packet is discarded and the packet is resent to the baseband processor. This can reduce a delay of retransmitting, by the terminal, the to-be-sent packet discarded by the baseband processor, and reduce, to some extent, a delay of responding to a packet loss by the terminal, so that data transmission between the terminal and a network is smoother. Because a status of a wireless cellular network often changes, a case in which the baseband processor discards a to-be-sent packet occurs frequently.

In addition, as described above, in an embodiment, in consideration of power consumption, the baseband processor does not report the information about the discarded to-be-sent packet until a status of a cellular network accessed by the terminal is available. In this case, information about some discarded to-be-sent packets needs to wait for specific time before being reported. This may cause the following two cases: In one case, a timeout timer of a discarded to-be-sent packet expires before information about the packet is reported by the baseband processor. In this case, a packet that is the same as the discarded packet may have been retransmitted by using a TCP connection and a timeout retransmission mechanism. The baseband processor no longer needs to report the information about the discarded packet to the application processor. The baseband processor may filter out the information about the discarded packet according to the received packet that is the same as the discarded packet, so that power waste and terminal traffic waste can be avoided. In the other case, when the application processor delivers a packet that is the same as a discarded packet, a timeout timer of the discarded packet expires. This case also equivalently meets a timeout retransmission requirement, and therefore a congestion control method for a TCP connection may be triggered.

It should be noted that the TCP retransmission mechanism can ensure reliable packet transmission, but in a prior-art retransmission mechanism, it is considered by default that a packet loss is caused by network congestion. Usually, a most common cause of a packet loss during network transmission is excessively heavy network load. The network device cannot handle an amount of data that needs to be transmitted in the network at a current moment, network congestion is caused, and therefore some packets transmitted in the network are discarded. Therefore, a congestion control method is used together with the retransmission mechanism to reduce congestion in the network, so as to improve a success rate of reaching a peer end by a retransmitted packet. A congestion control algorithm mainly includes slow start, congestion avoidance, and the like. In simple terms, when learning that a packet is lost and needs to be retransmitted, the application processor reduces values of some parameters to limit a quantity of packets sent by the terminal to a network, such as a value of a congestion window (CWND) and a slow start threshold (ssthresh). The application processor usually uses the adjusted parameters to control a rate of delivering a retransmitted packet to the baseband processor and a rate of delivering a subsequent to-be-sent packet to the baseband processor.

For example, if a packet loss causes timeout retransmission, the transmit end may reduce the slow start threshold to CWND/2, then set the CWND to 1, and re-enter a slow start process. For another example, if the transmit end determines, according to an ACK, that a packet is lost, and starts fast retransmission, the transmit end may decrease a congestion window by half, and set the slow start threshold to an updated congestion window size. It may be understood that, in different algorithms, amplitudes and manners of decreasing the congestion window and the slow start threshold are different, but in most cases, a packet discard backoff rule is used as a basis, that is, when the transmit end determines that a packet is lost in a network, the congestion window size and the slow start threshold are actively reduced.

However, because the active packet discard in this embodiment of the present invention is not caused by network congestion, a quantity of packets sent by the terminal to a wireless network does not need to be reduced, and because a packet is actively discarded by the baseband processor, a specific quantity of sent packets needs to be ensured to transmit a packet to the peer end as soon as possible. However, the method in this embodiment of the present invention is usually used in an existing TCP mechanism, and the foregoing problem that the CWND is decreased is inevitable.

Therefore, in an embodiment of the present invention, after the application processor transmits the second packet to the baseband processor according to the information about the first packet, the application processor increases the congestion window as compensation.

For example, the CWND may be increased to a specified initial value, or may be restored to a value, of a congestion window, used before decrease of the congestion window is triggered by the retransmission. In this embodiment of the present invention, a value to which the application processor increases the congestion window, a policy that is used by the application processor to increase the congestion window, and the like are not limited. In this way, impact from timeout retransmission can be eliminated, a quantity of packets sent by the terminal can be ensured, and a transmission throughput of the terminal can be improved.

In another embodiment, the application processor and the baseband processor (also referred to as a modem) may even be integrated into a same core of a same chip, and the foregoing method is also applicable to such a chip. For ease of description, in this embodiment, the chip is referred to as a processor, a TCP protocol stack and a 3GPP protocol stack may be understood as two tasks (or threads) running on the processor, the two tasks may belong to different processes or a same process, and the TCP protocol stack and the 3GPP protocol stack exchange information by using a communication mechanism between threads or processes. An application program further runs on the application processor. The application program further sends a packet, for example, data generated by the application program or a request that is of the application program and that is triggered by a user operation, to the base station by using the TCP protocol stack and the 3GPP protocol stack. The 3GPP protocol stack transfers information, such as an identifier of the packet and an identifier of a TCP connection at which the packet is located, about a discarded packet of the application program to the TCP protocol stack by using the communication mechanism between threads or processes, so that the TCP protocol stack transfers, to the 3GPP protocol stack according to the received information about the discarded packet, a packet that is the same as the discarded packet. The processor sends, to the base station by using the communications interface, the packet that is received by the 3GPP protocol stack and that is the same as the discarded packet. For other details in this embodiment, refer to the foregoing of this application. Details are not described herein again. In this way, a delay of retransmitting, by the terminal, a packet discarded by the baseband processor can be reduced, a delay between the terminal and the network device is reduced to some extent, and data transmission between the terminal and the network is smoother.

How the application processor cooperates, in an embodiment after the baseband processor discards a to-be-sent packet, with the baseband processor to complete retransmission is described below with reference to the software architecture in FIG. 3 by using a terminal with an Android system as an example. The application processor and the baseband processor are two cores or two independent chips. In this embodiment, for content mentioned above, refer to the foregoing descriptions. Details are not described herein again.

In this embodiment, the baseband processor includes a 3GPP protocol stack and a task used for transmitting a data packet with the application processor (referred to as an inter-core data transmission task for short), and further includes an inter-core communication task for transmitting a relatively small amount of data. The application processor includes another inter-core communication task corresponding to the inter-core communication task in the baseband processor, a TCP protocol stack, an IP protocol stack, and an application running at the application layer of the application processor.

The 3GPP protocol stack in the baseband processor monitors the to-be-sent packet discarded by the baseband processor and a status of a cellular network currently accessed by the terminal. Specifically, the 3GPP protocol stack may monitor an event due to which the baseband processor discards the to-be-sent packet, for example, handover between different cellular networks, so as to determine the discarded to-be-sent packet.

The 3GPP protocol stack generates information (including a sequence number of the discarded packet and a source port number of a TCP connection at which the discarded packet is located) about the to-be-sent packet discarded by the baseband processor and stores the information in a queue, generates information indicating whether a data connection of the terminal is available (which may be some parameters used to indicate whether the connection is available, or may be directly a Boolean value, where different values indicate whether the connection is available or unavailable), and transfers the foregoing two types of information to the inter-core communication task in the baseband processor by using, for example, a shared memory.

In addition, in the task that is in the baseband processor and that is used for transmitting a data packet with the application processor, a packet discarded in the task is also detected. Similar to the 3GPP protocol stack, the task transfers, to the inter-core communication task in the baseband processor, generated information (including a sequence number of the discarded packet and a source port number of a TCP connection at which the discarded packet is located) about the to-be-sent packet discarded by the baseband processor, by using for example, a shared memory.

The inter-core communication task manages the obtained information about the discarded packet by using a queue of the task. If the queue is full, the queue discards information that is about a discarded packet and that is obtained after the queue is full, and the inter-core communication task determines, according to information about the data connection of the terminal provided by the 3GPP protocol stack, whether the data connection of the terminal is available or unavailable.

When the data connection of the terminal is available, the inter-core communication task transmits the information about the discarded packet in the queue to the inter-core communication task in the application processor, so that the TCP/IP protocol stack of the application processor learns the information about the discarded packet.

When the data connection of the terminal is unavailable, a timer of the queue of the inter-core communication task is started, and when the timer expires, it is determined, again according to the information provided by the 3GPP protocol stack, whether the data connection of the terminal is available after a period of time timed by the timer. If the data connection is available, the inter-core communication task transmits the information about the discarded packet in the queue to the inter-core communication task in the application processor, and the timer is reset. If the data connection is still unavailable, the timer is reset, and the inter-core communication task determines when the timer expires next time.

The application processor parses the information that is about the discarded to-be-sent packet and that is transmitted by the baseband processor, to obtain the sequence number of the discarded packet and the source port number of the TCP connection at which the discarded packet is located.

The application processor finds the corresponding TCP connection in a Linux network protocol stack by using the source port number, compares the sequence number of the discarded to-be-sent packet with a sequence number of a packet in a sending queue of the TCP connection to find a copy of the discarded to-be-sent packet, and sends the copy of the discarded to-be-sent packet to the baseband processor by using the TCP/IP protocol stack.

In addition, if TCP congestion control has been triggered in a process of sending the copy of the discarded to-be-sent packet by the application processor, for example, after a copy of a to-be-sent packet is retransmitted, a CWND of the terminal is decreased to 1, and the application processor sets a current CWND value to a smaller value in an initial CWND value (TCP_INIT_CWND) of the terminal and a value used before the CWND is decreased to 1. In this way, unnecessary decrease of the congestion window may be avoided, to eliminate impact from timeout retransmission, and improve a throughput of the terminal, so that more packets can be sent in time, thereby reducing a delay caused by retransmission for a packet loss.

The baseband processor receives the copy that is of the to-be-sent packet and that is transmitted by the application processor, and sends the copy to the network device by using a radio frequency circuit such as an antenna.

In this way, after discarding the to-be-sent packet, the baseband processor may report, to the application processor, the information about the to-be-sent packet discarded by the baseband processor, so that the application processor can redeliver, to the baseband processor according to the reported information, the packet discarded by the baseband processor. It can be determined, before it is determined that a timeout timer of the packet expires and no acknowledgement packet is received from a peer end, that the packet is discarded and the packet is resent to the baseband processor. This can reduce a delay of retransmitting, by the terminal, the packet discarded by the baseband processor, and reduces a retransmission delay of the terminal to some extent, so that data transmission between the terminal and a network is smoother. Because a status of a wireless cellular network often changes, a case in which the baseband processor discards a to-be-sent packet occurs frequently.

The following describes an effect of the method in the foregoing embodiment by using a test result. A retransmission mechanism of a terminal is improved by using the method in the foregoing embodiment, so that a retransmission delay can be relatively significantly reduced, and a data throughput of uplink transmission is improved. To demonstrate a weak field scenario and a high-speed movement scenario of a cellular network, using a wireless cellular network of China Unicom on a high-speed railway from Guangzhou to Shenzhen is selected to perform testing.

For a transmission delay, a test tool iPerf is used and a sampling manner is to calculate a packet transmission delay actively reported for a packet loss in the 3GPP protocol stack that is caused in a task for transmitting a data packet with the application processor. A source end is a mobile phone whose peer end is a server. Before optimization, an average transmission delay is approximately 75 s. After optimization, an average transmission delay is approximately 45 s. An average retransmission delay for a discarded packet is optimized by 40%.

For an uplink transmission throughput (an uplink transmission direction is from a mobile phone terminal to a server), a test tool iPerf is used. A sampling manner is to calculate an average throughput (which is 100 s or 200 s per round, and is counted on a server side) counted during each iPerf test. Before optimization, an average throughput is approximately 1.5 Mbps. After optimization, an average throughput is approximately 3.3 Mbps. An average throughput is increased by about 2.2 times.

Figure 6:
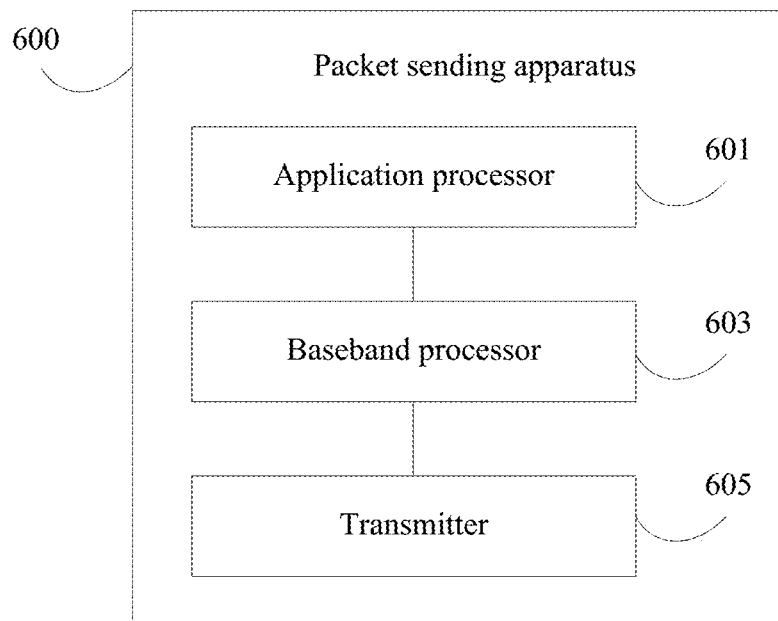
FIG. 6 is a schematic diagram of a packet sending apparatus according to an embodiment of the present invention.

An embodiment of the present invention further provides a packet sending apparatus 600, and a schematic structural diagram of the packet sending apparatus 600 is FIG. 6. The apparatus includes a baseband processor, an application processor, and a transmitter. The baseband processor is configured to report information about a first packet to the application processor. The first packet is a to-be-sent packet discarded by the baseband processor, and the information about the first packet includes an identifier of the first packet and an identifier of a TCP connection by using which the first packet is transmitted. The application processor is configured to transmit a second packet to the baseband processor according to the information about the first packet, and the second packet is the same as the first packet. The baseband processor is further configured to send the second packet to a network device by using the transmitter.

In an embodiment, in terms of reporting the information about the first packet to the application processor, the baseband processor is configured to: when a data connection of the apparatus is available, report the information about the first packet to the application processor.

In one embodiment, in terms of reporting the information about the first packet to the application processor, the baseband processor is configured to: when the data connection of the apparatus is unavailable, cache the information about the first packet, and when the data connection of the apparatus is switched from unavailable to available, report the information about the first packet to the application processor.

In one embodiment, the application processor is further configured to RRC after transmitting the second packet to the baseband processor according to the information about the first packet.

In one embodiment, the identifier of the first packet is a sequence number of the first packet, and the identifier of the TCP connection by which the first packet is transmitted is a source port number of the TCP connection; and in terms of transmitting the second packet to the baseband processor according to the information about the first packet, the application processor is configured to transmit the second packet that has a same sequence number as the first packet to the baseband processor according to the source port number.

It should be noted that for specific explanations and related beneficial effects of nouns and blocks in this embodiment, refer to the foregoing descriptions, and details are not described herein again.

Figure 7:
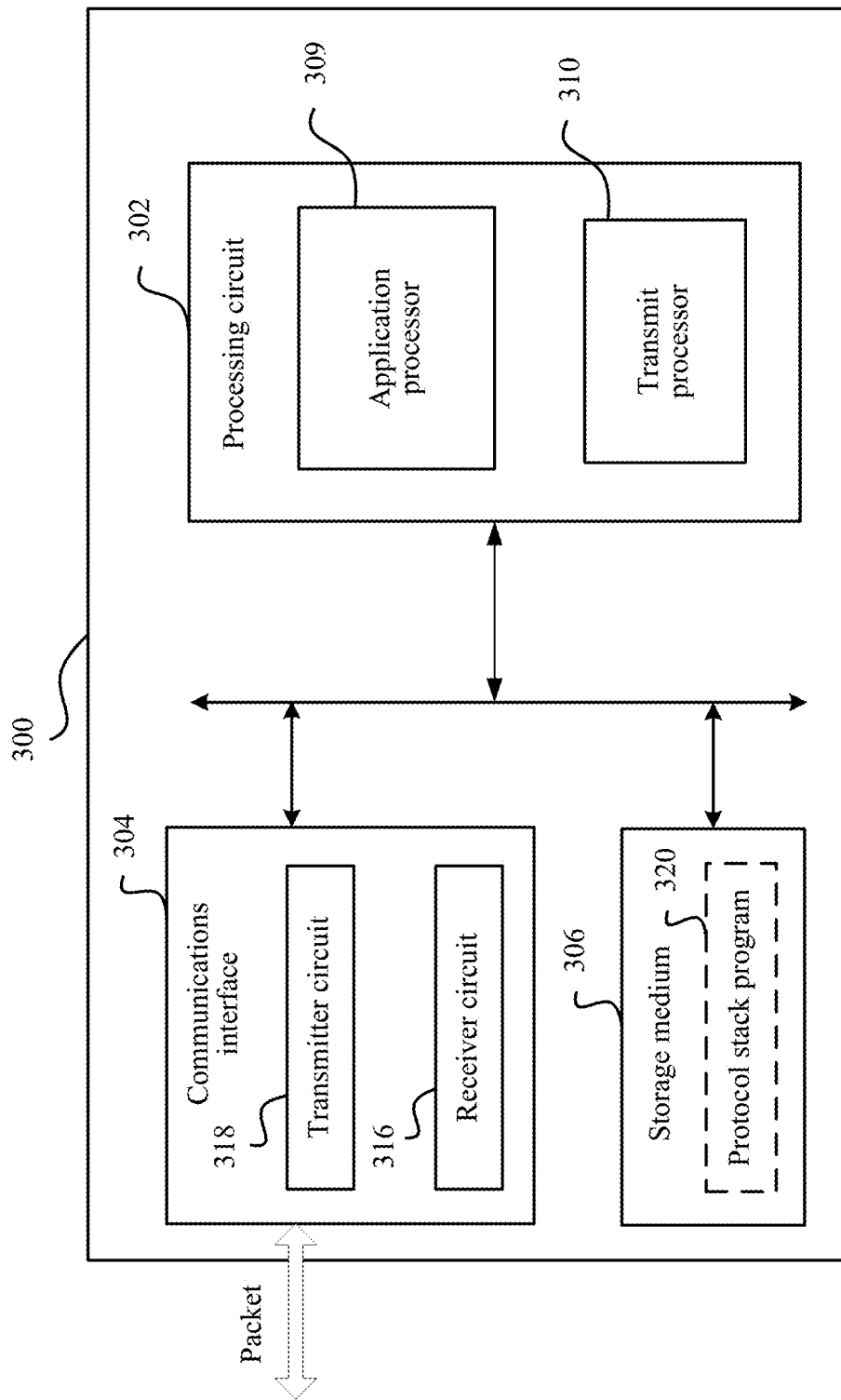
FIG. 7 is a schematic diagram of a terminal according to an embodiment of the present invention.

It may be understood that the apparatus described in the foregoing method embodiments may be implemented by any device that transmits or performs a data service by using a data service provided by a cellular network. The present invention further provides a terminal, to implement the method in the foregoing method embodiments. A schematic structural diagram of the terminal is shown in FIG. 7 as terminal 300. The terminal 300 includes a processing circuit 302, and a communications interface 304 and a storage medium 306 that are connected to the processing circuit 302. It may be learned that the transmitter in the embodiment in FIG. 6 is equivalent to a transmitter circuit 318 in the communications interface 304.

The processing circuit 302 is configured to: process data, control data access and storage, send a command, and control another device to perform an operation. The processing circuit 302 may be implemented as one or more processors, one or more controllers, and/or another structure that may be used to execute a program. The processing circuit 302 may specifically include at least one of a general purpose processor, a digital signal processor (DSP), an application-specific integrated circuit (ASIC), a field programmable gate array (FPGA), or another programmable logic component. The general purpose processor may include a microprocessor, and any conventional processor, controller, microcontroller, or state machine. The processing circuit 302 may alternatively be implemented as a computing component, such as a combination of a DSP and a microprocessor.

In this embodiment of the present invention, the processing circuit includes an application processor 309 and a baseband processor 310.

The storage medium 306 may include a computer-readable storage medium, such as a magnetic storage device (such as a hard disk, a floppy disk, or a magnetic stripe), an optical storage medium (such as a digital versatile disc (DVD)), a smart card, a flash memory device, a random access memory (RAM), a read-only memory (ROM), a programmable ROM (PROM), an erasable PROM (EPROM), a register, or any combination thereof. The storage medium 306 may be coupled to the processing circuit 302, so that the processing circuit 302 can read information and write the information into the storage medium 306. Specifically, the storage medium 306 may be integrated into the processing circuit 302, or the storage medium 306 and the processing circuit 302 may be separated.

The communications interface 304 may include circuits and/or programs to implement bidirectional communication between the terminal 300 and one or more wireless network devices (for example, a base station or a server). The communications interface 304 may be coupled to one or more antennas (not shown in FIG. 7), and includes at least one receiver circuit 316 and/or at least one transmitter circuit 318.

In an embodiment, the storage medium 306 stores a protocol stack program 320, and the processing circuit 302 executes the protocol stack program 320 to implement a function of a protocol stack. For a relationship between the protocol stack and each of the application processor 309 and the baseband processor 310, refer to related descriptions in FIG. 3.

Figure 8A:
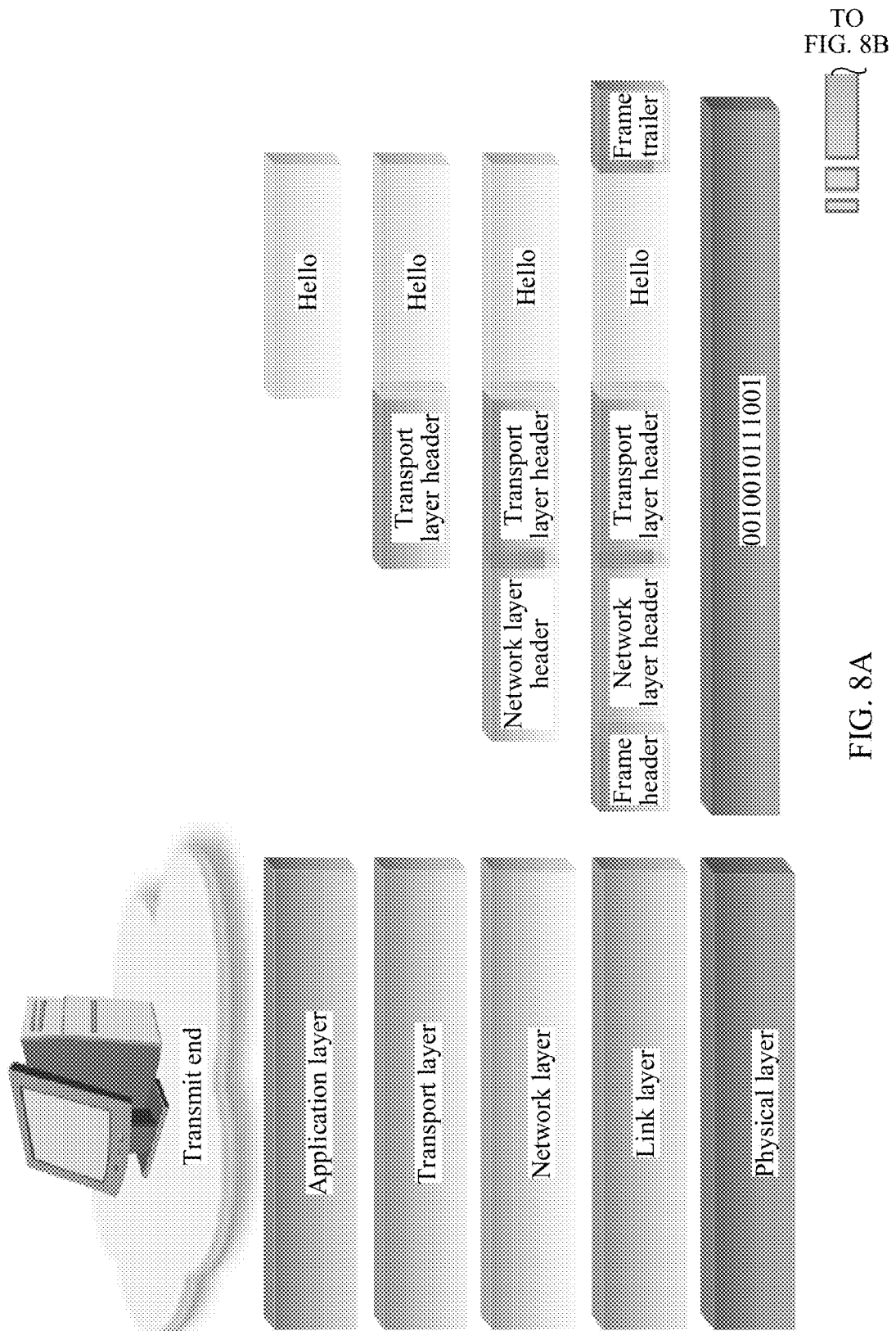
FIG. 8A and FIG. 8B are a schematic diagram of an encapsulation process during packet transmission between a transmit end and a receive end according to an embodiment of the present invention.
Figure 8B:
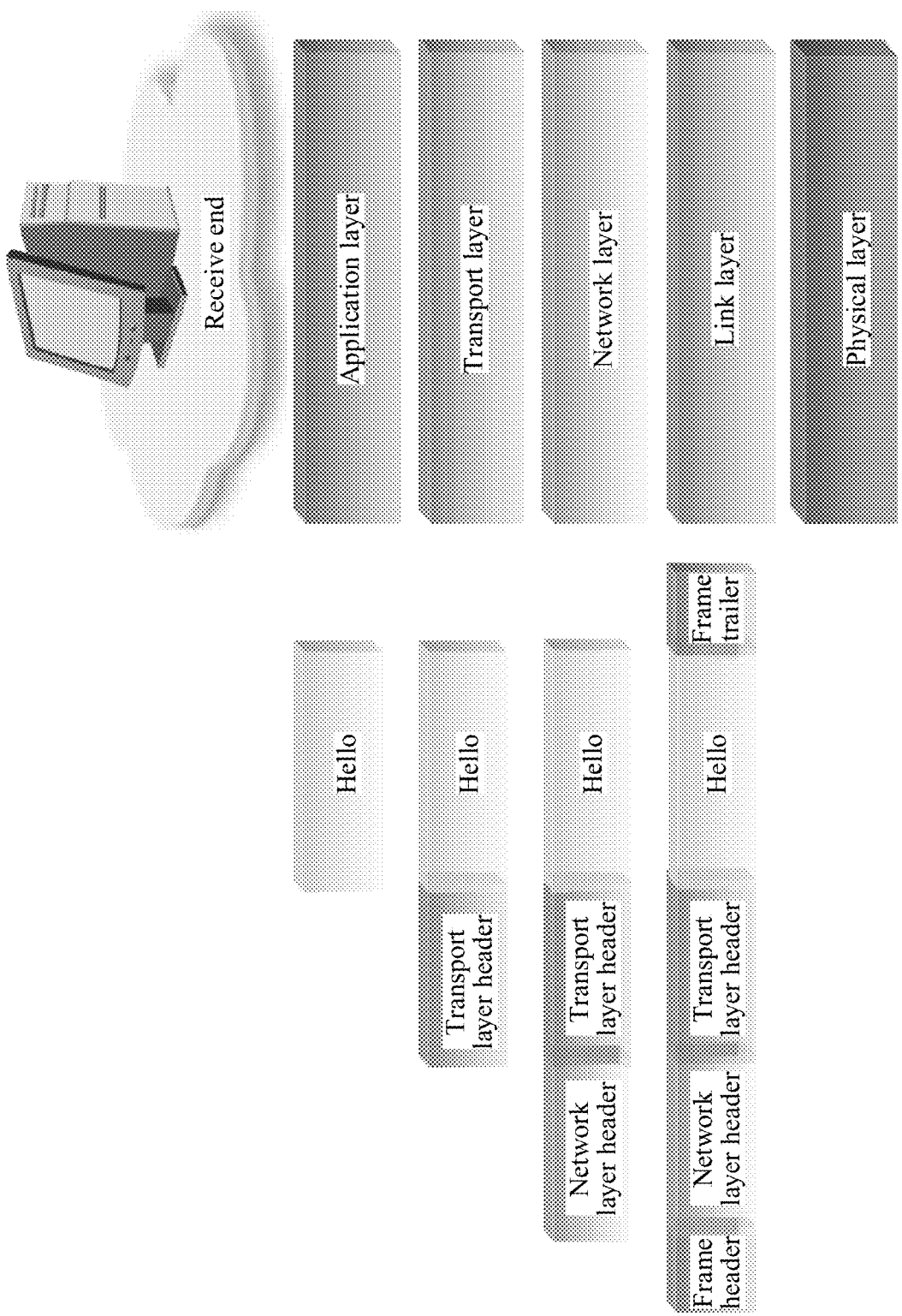
Figure 8A:

The protocol stack is used to: encapsulate data of an application program into a plurality of packets in a specific data format according to the TCP/IP protocol specification, and send the plurality of packets to an application server by using the transmitter circuit 318. In addition, the protocol stack further decapsulates a packet received by the receiver circuit 316 to finally obtain data of an application program. Processes of encapsulating and decapsulating packets by the protocol stack are shown in FIG. 8A and FIG. 8B. It may be learned that a packet encapsulation process is essentially a process in which the protocol stack adds a header and/or a frame trailer to a packet, and a packet decapsulation process is essentially a process of removing a header and/or a frame trailer from a packet. After decoding and/or decapsulating data received by the communications interface 304, the protocol stack may transfer the data to an application program at an upper layer, or may encapsulate data of an application program and then send the data to another device by using the communications interface.

In an embodiment, the protocol stack may include a physical layer, a data link layer, a network layer, a transport layer, and an application layer, so as to implement protocols of the layers. For example, the physical layer is used to define a physical device interface feature, a transmission medium type, a transmission rate, a transmission mode, and the like, and implement signal processing at the physical layer. Similarly, the data link layer is used to implement a function of the data link layer, for example, is responsible for distributing signaling generated at the network layer and processing information generated by the physical layer. The data link layer may include one or more submodules, such as a Media Access Control (MAC) layer module, a Radio Link Control (RLC) layer module, and a logical link control (LLC) layer module that are respectively configured to implement functions of the MAC layer, the RLC layer, and the LLC layer. For example, the MAC layer module is configured to transmit upper-layer protocol data by using a service provided by the physical layer and manage data access between an upper layer and an air interface. The RLC layer module is used for data segmentation and reconstruction. The LLC layer module is configured to provide flow control, sequence control, and error control functions. Further, the network layer is configured to implement functions such as logical addressing and routing selection. The transport layer is configured to implement functions such as port addressing, segmentation and reconstruction, connection control, flow control, and error control. The application layer is configured to provide an interface for an application program at an upper layer.

Referring back to FIG. 7, according to one or more embodiment of the present invention, the processing circuit 302 is adapted to execute the protocol stack program 320 stored in the storage medium 306, so as to implement a function of the protocol stack. The protocol stack in the application processor 309 and the protocol stack in the baseband processor 310 specifically implement some or all of the blocks in the foregoing method embodiments.

An embodiment of the present invention further provides a chip. The chip establishes a data connection to a network device by using a radio frequency component, and the chip includes an application processor and a baseband processor. The baseband processor is configured to report information about a first packet to the application processor. The first packet is a to-be-sent packet discarded by the baseband processor, and the information about the first packet includes an identifier of the first packet and an identifier of a TCP connection by which the first packet is transmitted. The application processor is configured to transmit a second packet to the baseband processor according to the information about the first packet, and the second packet is the same as the first packet. The baseband processor is further configured to send the second packet to the network device by using the radio frequency component.

That is, the chip described in this embodiment of the present invention is actually the processing circuit 302 that is disposed and used in the terminal shown in FIG. 7.

In one embodiment, in terms of reporting the information about the first packet to the application processor, the baseband processor is configured to: when a data connection of the chip is available, report the information about the first packet to the application processor.

In another embodiment, in terms of reporting the information about the first packet to the application processor, the baseband processor is configured to: when the data connection of the chip is unavailable, cache the information about the first packet, and when the data connection of the chip is switched from unavailable to available, report the information about the first packet to the application processor.

In another embodiment, the application processor is further configured to increase a congestion window after transmitting the second packet to the baseband processor according to the information about the first packet.

In another embodiment, the identifier of the first packet is a sequence number of the first packet, and the identifier of the TCP connection by which the first packet is transmitted is a source port number of the TCP connection; and in terms of transmitting the second packet to the baseband processor according to the information about the first packet, the application processor is configured to transmit the second packet that has a same sequence number as the first packet to the baseband processor according to the source port number.

For further details of the chip described in this embodiment, refer to the descriptions of the embodiment of the terminal shown in FIG. 8A and FIG. 8B and the method that can be implemented for the foregoing chip, and details are not described herein again.

An embodiment of the present invention further provides a storage medium, and the medium is configured to store code for implementing the packet sending method described in the present invention.

The packet sending method and apparatus provided in this application are described in detail above. In this specification, specific examples are applied to describe the principle and the embodiment of the present invention, and the description of the foregoing embodiments is only intended to help understand the method and core idea of the present invention. In addition, a person of ordinary skill in the art can make modifications to specific embodiment and application scopes according to the idea of the present invention. In conclusion, the content of this specification shall not be construed as a limitation on the present invention.

What is claimed is:

1. A packet sending method, wherein the method is applied to a terminal, the terminal comprises a baseband processor, an application processor, and a communications interface, the method comprising:
   reporting, by the baseband processor, information about a first packet to the application processor when a data connection of the terminal is available, wherein the first packet is a to-be-sent packet discarded by the baseband processor, and wherein the information about the first packet comprises an identifier of the first packet;
   transmitting, by the application processor, a second packet to the baseband processor according to the information about the first packet, wherein the second packet is the same as the first packet; and
   sending, by the baseband processor, the second packet to a network device by using the communications interface.

2. The method of claim 1, wherein the reporting, by the baseband processor, information about a first packet to the application processor comprises:
   caching, by the baseband processor, the information about the first packet when the data connection of the terminal is unavailable; and
   reporting, by the baseband processor, the information about the first packet to the application processor when the data connection of the terminal is switched from unavailable to available.

3. The method of claim 1, wherein after transmitting, by the application processor, the second packet to the baseband processor according to the information about the first packet, the method further comprises:
   increasing, by the application processor, a value of a congestion window of a Transport Control Protocol (TCP) connection by which the first packet is transmitted.

4. The method of claim 1, wherein the identifier of the first packet is a sequence number of the first packet, and wherein the transmitting, by the application processor, a second packet to the baseband processor according to the information about the first packet comprises:
   transmitting, by the application processor, the second packet that has a same sequence number as the sequence number of the first packet to the baseband processor according to a source port number of a Transport Control Protocol (TCP) connection by which the first packet is transmitted.

5. The method of claim 1, the method further comprising:
   determining, by the baseband processor, the first packet based on reasons of packet discarding, wherein the reasons of packet discarding comprises at least one of:
   a radio resource control (RRC) link establishment has not been established by the terminal;
   an E-UTRAN radio access bearer management (ERABM) message is received by the baseband processor;
   the terminal handing over in different types of cellular networks;
   a packet data convergence protocol (PDCP) reconfiguration;
   a radio link control (RLC) reconfiguration;
   an RLC re-establishment;
   a PDCP queue is full; or
   a service interruption,
   wherein the first packet is a packet in at least a cache queue, a to-be-sent packet in a PDCP queue, a packet fails to be saved in the cache queue, or a packet fails to be inserted into the PDCP queue.

6. The method of claim 1, the method further comprising:
   determining, by the baseband processor, whether the data connection of the terminal is available or unavailable, wherein the data connection of the terminal is unavailable comprises at least one of:
   the terminal is in a disconnected state;
   the terminal fails to normally camp on any serving cell;
   a data service of the terminal is in a disabled state; or
   the terminal is in a 2G call scenario when a circuit switched domain falls back to 2G.

7. A packet sending apparatus comprising:
   a baseband processor, an application processor, and a transmitter, wherein
   the baseband processor is configured to report information about a first packet to the application processor when a data connection of the apparatus is available, wherein the first packet is a to-be-sent packet discarded by the baseband processor, and wherein the information about the first packet comprises an identifier of the first packet;
   the application processor is configured to transmit a second packet to the baseband processor according to the information about the first packet, wherein the second packet is the same as the first packet; and
   the baseband processor is further configured to send the second packet to a network device by using the transmitter.

8. The apparatus of claim 7, wherein the baseband processor is further configured to:
   cache the information about the first packet when the data connection of the apparatus is unavailable; and
   report the information about the first packet to the application processor when the data connection of the apparatus is switched from unavailable to available.

9. The apparatus of claim 7, wherein the application processor is further configured to increase a value of a congestion window of a Transport Control Protocol (TCP) connection by which the first packet is transmitted after the application processor is configured to transmit the second packet to the baseband processor according to the information about the first packet.

10. The apparatus of claim 7, wherein the baseband processor is further configured to determine the first packet based on reasons of packet discarding, wherein the reasons of packet discarding comprises at least one:
  a radio resource control (RRC) link establishment has not been established by the apparatus;
  an E-UTRAN radio access bearer management (ERABM) message is received by the baseband processor;
  the apparatus handing over in different types of cellular networks;
  a packet data convergence protocol (PDCP) reconfiguration;
  a radio link control (RLC) reconfiguration;
  an RLC re-establishment;
  a PDCP queue is full; or
  a service interruption,
  wherein the first packet is a packet in at least a cache queue, a to-be-sent packet in a PDCP queue, a packet fails to be saved in the cache queue, or a packet fails to be inserted into the PDCP queue.

11. The apparatus of claim 7, wherein the baseband processor is further configured to determine whether the data connection of the apparatus is available or unavailable, wherein the data connection of the apparatus is unavailable comprises at least one of:
  the apparatus is in a disconnected state;
  the apparatus fails to normally camp on any serving cell;
  a data service of the apparatus is in a disabled state; or
  the apparatus is in a 2G call scenario when a circuit switched domain falls back to 2G.

12. A non-transitory computer-readable medium storing computer instructions for sending packet, that when executed by a baseband processor and an application processor of a terminal, cause the baseband processor and the application processor to perform the method comprising:
  reporting, by the baseband processor, information about a first packet to the application processor when a data connection of the terminal is available, wherein the first packet is a to-be-sent packet discarded by the baseband processor, and wherein the information about the first packet comprises an identifier of the first packet;
  transmitting, by the application processor, a second packet to the baseband processor according to the information about the first packet, wherein the second packet is the same as the first packet; and
  sending, by the baseband processor, the second packet to a network device by using a communications interface.

13. The non-transitory computer-readable medium of claim 12, wherein when reporting, by the baseband processor, information about a first packet to the application processor, the baseband processor is further caused to perform:
  caching the information about the first packet when the data connection of the terminal is unavailable; and
  reporting the information about the first packet to the application processor when the data connection of the terminal is switched from unavailable to available.

14. The non-transitory computer-readable medium of claim 12, the method further comprising:
  determining, by the baseband processor, the first packet based on reasons of packet discarding, wherein the reasons of packet discarding comprises at least one of:
  a radio resource control (RRC) link establishment has not been established by the terminal;
  an E-UTRAN radio access bearer management (ERABM) message is received by the baseband processor;
  the terminal handing over in different types of cellular networks;
  a packet data convergence protocol (PDCP), reconfiguration;
  a radio link control (RLC) reconfiguration;
  an RLC re-establishment;
  a PDCP queue is full or
  a service interruption,
  wherein the first packet is a packet in at least a cache queue, a to-be-sent packet in a PDCP queue, a packet fails to be saved in the cache queue, or a packet fails to be inserted into the PDCP queue.

15. The non-transitory computer-readable medium of claim 12, the method further comprising:
  determining, by the baseband processor, whether the data connection of the terminal is available or unavailable, wherein the data connection of the terminal is unavailable comprises at least one of:
  the terminal is in a disconnected state;
  the terminal fails to normally camp on any serving cell;
  a data service of the terminal is in a disabled state; or
  the terminal is in a 2G call scenario when a circuit switched domain falls back to 2G.

16. A chip, wherein the chip is configured to establish a data connection to a network device by using a radio frequency component, the chip comprising an application processor and a baseband processor, wherein
  the baseband processor is configured to report information about a first packet to the application processor when a data connection of the terminal is available, wherein the first packet is a to-be-sent packet discarded by the baseband processor, and wherein the information about the first packet comprises an identifier of the first packet;
  the application processor is configured to transmit a second packet to the baseband processor according to the information about the first packet, wherein the second packet is the same as the first packet; and
  the baseband processor is further configured to send the second packet to the network device by using the radio frequency component.

17. The chip claim 16, wherein the baseband processor is further configured to determine the first packet based on reasons of packet discarding, wherein the reasons of packet discarding comprises at least one of:
  a radio resource control (RRC) link establishment has not been established by the chip;
  an E-UTRAN radio access bearer management (ERABM) message is received by the baseband processor;
  the chip handing over in different types of cellular networks;
  a packet data convergence protocol (PDCP) reconfiguration;
  a radio link control (RLC) reconfiguration;
  an RLC re-establishment;
  a PDCP queue is full; or
  a service interruption,
  wherein the first packet is a packet in at least a cache queue, a to-be-sent packet in a PDCP queue, a packet fails to be saved in the cache queue or a packet fails to be inserted into the PDCP queue.

18. The chip of claim 16, wherein the baseband processor is further configured to determine whether a data connection of the apparatus is available or unavailable, wherein the data connection of the apparatus is unavailable comprises at least one of:
  the apparatus is in a disconnected state;
  the apparatus fails to normally camp on any serving cell;
  a data service of the apparatus is in a disabled state; or the apparatus is in a 2G call scenario when a circuit switched domain falls back to 2G.

19. The chip of claim 16, wherein the baseband processor is further configured to:
cache the information about the first packet when the data connection of the terminal is unavailable; and
report the information about the first packet to the application processor when the data connection of the terminal is switched from unavailable to available.

20. The chip of claim 16, wherein the application processor is further configured to increase a value of a congestion window of a Transport Control Protocol (TCP) connection by which the first packet is transmitted after the second packet is transmitted to the baseband processor.

* * * * *